United States Patent
Behrens et al.

(10) Patent No.: US 9,845,154 B2
(45) Date of Patent: Dec. 19, 2017

(54) EXTERNAL LOAD MASS ROPE OF A ROTORCRAFT

(71) Applicant: AIRBUS HELICOPTERS DEUTSCHLAND GMBH, Donauworth (DE)

(72) Inventors: Michael Behrens, Harburg (DE); Markus Wahnfried, Geltendorf (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 286 days.

(21) Appl. No.: 14/711,243

(22) Filed: May 13, 2015

(65) Prior Publication Data
US 2015/0360779 A1 Dec. 17, 2015

(30) Foreign Application Priority Data

May 14, 2014 (EP) .................................... 14400035

(51) Int. Cl.
*B64D 1/22* (2006.01)
*B64D 9/00* (2006.01)
*B64C 1/22* (2006.01)

(52) U.S. Cl.
CPC .................. *B64D 9/00* (2013.01); *B64C 1/22* (2013.01); *B64D 1/22* (2013.01)

(58) Field of Classification Search
CPC ..................................... B64D 1/22; B64C 1/22
See application file for complete search history.

(56) References Cited

U.S. PATENT DOCUMENTS

| | | | | |
|---|---|---|---|---|
| 1,935,283 A | * | 11/1933 | Adams | B64D 1/22 258/1.8 |
| 3,265,336 A | | 8/1966 | Peterson | |
| 3,690,602 A | * | 9/1972 | Marsh | B64D 1/22 244/137.4 |

(Continued)

FOREIGN PATENT DOCUMENTS

| | | |
|---|---|---|
| CN | 2716137 Y | 8/2005 |
| CN | 101981469 A | 2/2011 |

(Continued)

OTHER PUBLICATIONS

Chinese First Office Action, dated Aug. 22, 2016, Application No. 201510245342.4, Applicant Airbus Helicopters Deutschland GmbH, 7 pages.

(Continued)

*Primary Examiner* — Tien Q Dinh
*Assistant Examiner* — Richard R Green
(74) *Attorney, Agent, or Firm* — Brooks Kushman P.C.

(57) ABSTRACT

An external load mass rope for attachment to a cargo hook device of a rotorcraft that comprises at least one first cargo hook and at least one second cargo hook, the external load mass rope comprising at least one first rope leg and at least one second rope leg, wherein the at least one first rope leg is adapted for attachment to the at least one first cargo hook and the at least one second rope leg is adapted for attachment to the at least one second cargo hook, characterized in that at least one of the first and second rope legs comprises an associated length adjustment unit that is adapted to shorten or lengthen the at least one of the first and second rope legs in operation on the basis of associated operating parameters.

20 Claims, 14 Drawing Sheets

(56) References Cited

U.S. PATENT DOCUMENTS

| | | | | |
|---|---|---|---|---|
| 3,838,836 A * | 10/1974 | Asseo | ............ | B64D 1/22 |
| | | | | 244/137.4 |
| 4,152,019 A * | 5/1979 | Jarman | ............ | B64D 1/22 |
| | | | | 244/137.1 |
| 5,143,326 A | 9/1992 | Parks | | |
| 6,533,220 B2 * | 3/2003 | Schuster | ............ | B64D 1/22 |
| | | | | 244/118.1 |
| 7,948,237 B2 | 5/2011 | Kuzmin et al. | | |
| 9,205,922 B1 * | 12/2015 | Bouwer | ............ | B64D 1/22 |
| 2012/0145832 A1 | 6/2012 | Schuster | | |

FOREIGN PATENT DOCUMENTS

| | | | | |
|---|---|---|---|---|
| DE | 1106605 | | 5/1961 | |
| DE | 1232830 | | 1/1967 | |
| DE | 102008027306 | | 12/2009 | |
| EP | 0669277 A1 * | | 8/1995 | ............ B64D 1/22 |
| WO | 9942364 | | 8/1999 | |

OTHER PUBLICATIONS

European Search Report for EP 14400035, Completed by the European Patent Office dated Nov. 10, 2014, 6 Pages.

* cited by examiner

EXTERNAL LOAD MASS ROPE OF A ROTORCRAFT

CROSS REFERENCE TO RELATED APPLICATION

This application claims priority to European patent application No. EP 14 400035.3 filed on May 14, 2014, the disclosure of which is incorporated in its entirety by reference herein.

BACKGROUND OF THE INVENTION (1) Field of the Invention

The invention is related to an external load mass rope for attachment to a cargo hook device of a rotorcraft that comprises at least one first cargo hook and at least one second cargo hook, said external load mass rope comprising the features of claim 1.

(2) Description of Related Art

Rotorcrafts, and in particular helicopters, are commonly used to fulfil aerial transportation and delivery tasks. By way of example, helicopters are used to transport and deliver loads to mountain regions in general and, more specifically, to mountain regions where no roads exist or where roads cannot be used for transportation and delivery, e.g. due to extreme weather conditions in winter and so on. Furthermore, helicopters are used in transportation and delivery of loads for military purposes or in the construction sector, where the loads may represent any kind of material. Moreover, helicopters can be used in firefighting for transportation of firefighting buckets. In addition, helicopters are also very useful in wood logging for transporting harvested wood. In all of these cases, the helicopters can be required to transport comparatively heavy external loads which can, depending on an underlying type of helicopter, weigh up to several tons.

In order to enable a given helicopter for transportation of an external load, it can be equipped with a cargo hook device to which an external load mass rope for connection to the external load can be attached. Thus, a given external load can be suspended from the helicopter by means of the external load mass rope, which is particularly useful for bulky loads which do not fit into the cabin of the helicopter.

However, such an external load mass rope and also the cargo hook device must be designed and constructed specifically for carrying also comparatively heavy external loads with a high degree of safety, while being as small as possible for helicopter integration reasons. Furthermore, such designing and constructing also requires the compliance with applicable safety regulations and specifications, such as the US-American Federal Aviation Regulations (FAR) and/or the European Certification Specifications (CS).

According to the FAR and CS, a non-human external load or non-human external cargo (NHEC) is commonly transported by using a cargo hook device in single cargo hook arrangement, i.e. with a single cargo hook. In contrast, a human external load or human external cargo (HEC) is commonly transported by using a cargo hook device in double cargo hook arrangement, i.e. with two separate cargo hooks. In such cargo hook devices, the cargo hooks are usually designed to have identical rated loads independent on whether they are used in single cargo hook arrangement or in double cargo hook arrangement. However, particularly for NHEC transportation the rated load of each cargo hook is the limiting factor that defines the maximum external load mass that can be suspended from a given helicopter.

More specifically, in the double cargo hook arrangement two cargo hooks are provided in order to fulfil e.g. the safety requirements for HEC transportation according to FAR 29.865. However, the second cargo hook usually only acts as back-up cargo hook as described below. Although the double cargo hook arrangement is mandatory for transportation of HEC and not required for transportation of NHEC, it can nevertheless be used to transport NHEC even if it is not required to fulfil the FAR requirements for NHEC transportation. In this case, the second cargo hook is generally simply not used during NHEC transportation, but nevertheless installed on the underlying cargo hook device with all on-going penalties.

As already mentioned above, the cargo hooks of the different cargo hook devices usually connect a given helicopter via suitable external load mass ropes to any HEC or NHEC that is to be transported. For a cargo hook device in single cargo hook arrangement having a single cargo hook a single rope is used, while generally a so-called Y-rope is used for a cargo hook device in double cargo hook arrangement having two cargo hooks.

The document US 2012/0145832 A1 describes a load lifting apparatus for a helicopter with a single rope that is embodied by a cable, including a supply length in a cable store. The cable store is embodied by a winch that is attached to the helicopter by means of an associated extension arm. The cable is secured at one end to the helicopter, i.e. the winch, and has a free end. A load-bearing element, on which a load to be raised can be secured, is arranged on the cable. The cable can be removed from the cable store in order to lower the load-bearing element downwards from the helicopter. As the load-bearing element is lowered or pulled upwards, the cable acts at a force-introduction location on the helicopter. The load-bearing element is arranged on the cable such that it can move along the cable. At least one cable-attachment location is present on the helicopter, and is spaced apart from the force-introduction location and has, or can have, the free end of the cable secured on it.

However, this load lifting apparatus requires use of the winch and the extension arm which unnecessarily augment the overall weight of the helicopter, thereby negatively impacting its performances. Furthermore, the cable that implements the single rope is not suitable for use with a cargo hook device in double cargo hook arrangement having two cargo hooks, which are generally used in combination with suitable Y-ropes, as described above. Such a Y-rope usually comprises a specific load transfer leg and a back-up leg that is longer than the load transfer leg, wherein both legs are separately attached to one of the two cargo hooks, respectively.

However, in operation of the helicopter the complete mass of the external load will always be transferred to the helicopter via the load transfer leg independent of a respective deflection angle of the external load relative to the helicopter in forward or backward flight of the latter. Thus, the cargo hook to which the back-up leg is attached merely serves as a back-up hook.

Alternatively, such a Y-rope may comprise two legs with identical lengths, wherein the complete mass of the external load is transferred to the helicopter via both legs during hover and in lifting of the helicopter. However, in forward or backward flight of the helicopter the complete mass of the external load is transferred to the helicopter via only one of the two legs, so that the cargo hook to which the other one of the two legs is attached again merely serves as a back-up hook.

In other words, with a cargo hook device in double cargo hook arrangement having two cargo hooks in combination with anyone of such commonly used Y-ropes, the complete mass of the external load is always almost exclusively transferred to the helicopter in operation via a single cargo hook, independent on whether HEC or NHEC is transported. Thus, although a second cargo hook with a given self-weight is provided, it is almost unused for transportation or load supporting purposes, so that its self-weight merely represents additional weight that must also be transported by the helicopter and, therefore, negatively impacts respective helicopter performances.

Furthermore, as the rated load of the cargo hook to which the external load mass is transferred is the limiting factor that defines the maximum external load mass that can be suspended from a given helicopter in NHEC transportation, this maximum external load is limited to the lowest rated load of the two cargo hooks. Thus, if greater external load masses should be transported in NHEC transportation, the two cargo hooks must be designed stronger in order to resist against such greater external load masses. However, while getting stronger the cargo hooks usually also get heavier with a greater self-weight that again negatively impacts the respective helicopter performances.

Another possibility for enlarging transportable external load masses in NHEC transportation with a helicopter having a cargo hook device in double cargo hook arrangement with two cargo hooks would be to divide the external load mass in all flight modes and conditions such that it is distributed to both cargo hooks. Thus, both cargo hooks contribute in carrying the external load mass which could, consequently, be greater than in cases where only one of the cargo hooks carries the complete external load mass.

The document U.S. Pat. No. 3,265,336 A describes a helicopter with means for suspending a cargo from the helicopter at associated hard points, where each hard point contributes in all flight modes and conditions in carrying the external load mass defined by the cargo. These means comprise two single ropes which are embodied by cables that are supported by four pulley units, each pulley unit being attached via an associated bracket to a corresponding hard point provided at a lower side of the fuselage of the helicopter. Each cable connects two diagonally opposite pulley units, so that the two cables cross each other in a central section thereof.

However, these means for suspending a cargo from the helicopter use four pulley units which unnecessarily augment the overall weight of the helicopter, thereby negatively impacting its performances. Furthermore, the crossing of the two cables in their central sections may lead to undesired friction and, consequently, undesired abrasion that could shorten the lifetime of the cables and negatively impact their functionality.

BRIEF SUMMARY OF THE INVENTION

It is, therefore, an object of the present invention to provide new suspension means that are at least suitable for suspending an HEC or NHEC from a helicopter, or more generally any rotorcraft, while distributing a respective external load mass to more than one associated cargo hooks of the rotorcraft in all flight modes and conditions thereof.

This object is solved by an external load mass rope for attachment to a cargo hook device of a rotorcraft that comprises at least one first cargo hook and at least one second cargo hook, said external load mass rope comprising the features of claim 1.

More specifically, according to the invention an external load mass rope for attachment to a cargo hook device of a rotorcraft that comprises at least one first cargo hook and at least one second cargo hook is provided. Said external load mass rope comprises at least one first rope leg and at least one second rope leg, wherein said at least one first rope leg is adapted for attachment to said at least one first cargo hook and said at least one second rope leg is adapted for attachment to said at least one second cargo hook. At least one of said first and second rope legs comprises an associated length adjustment unit that is adapted to shorten or lengthen said at least one of said first and second rope legs in operation on the basis of associated operating parameters.

The inventive external load mass rope allows to enlarge a payload, and in particular a NHEC payload that is applicable to a rotorcraft with a cargo hook device in double cargo hook arrangement compared to the rated load of each single cargo hook, as an external load mass suspended from the rotorcraft by means of this external load mass rope is advantageously distributed on both cargo hooks. This is achieved by using the commonly unused back-up cargo hook, which is normally not needed in case of NHEC transportation, to increase the payload that is applicable to the rotorcraft and, thus, the external load mass that can be transported by the rotorcraft.

Preferably, the inventive external load mass rope is designed as a three-leg Y-Rope that is installed between both cargo hooks of the cargo hook device in double cargo hook arrangement. According to one aspect, the inventive external load mass rope is adapted to elongate or shorten depending on the external load mass of the external load and a so-called external sling load angle, i.e. a deflection angle of the external load relative to the rotorcraft in forward or backward flight of the latter. Thus, the external load mass can be divided and distributed to both cargo hooks, preferably as equal as possible.

Advantageously, the external load mass, in particular for NHEC transportation, can be enlarged with compact cargo hooks even beyond the rated load of each one the two cargo hooks. Furthermore, a compact system arrangement for double cargo hook installation can be obtained and the same cargo hooks can be used for HEC or NHEC transportation with an increased maximum external load. Moreover, different kinds of shock loads, g-loads or vibrations during external load operation can be reduced due to the functioning of the length adjustment device. Thus, more flexibility in operation can be achieved for the operator.

Preferably, the inventive external load mass rope has an associated length adjustment unit installed in each leg of the Y-Rope. Each such length adjustment unit is preferably at least adapted to elongate in order to divide the external load mass on each cargo hook and at the same time to prevent an overload condition of each single cargo hook.

According to a preferred embodiment, said associated length adjustment unit comprises a shortening and lengthening capacity that is defined as a function of a predetermined clearance between said at least one first cargo hook and said at least one second cargo hook.

According to a further preferred embodiment, said associated length adjustment unit is adapted to shorten or lengthen said at least one of said first and second rope legs in operation on the basis of said associated operating parameters for distributing a payload that is applied to said external load mass rope to said at least one first rope leg and said at least one second rope leg.

According to a further preferred embodiment, an external load mass interface is provided for attachment to an external load mass that is to be carried by said rotorcraft in operation, said external load mass being deflected in forward or backward flight of said rotorcraft by an associated external load mass deflection angle, wherein said associated operating parameters comprise at least weight and dimensions of said external load mass and/or said external load mass deflection angle.

According to a further preferred embodiment, said associated length adjustment unit is adapted to shorten or lengthen said at least one of said first and second rope legs in operation depending at least on said weight and dimensions of said external load mass and/or said external load mass deflection angle for distributing a payload that is applied to said external load mass rope by said external load mass to said at least one first rope leg and said at least one second rope leg.

According to a further preferred embodiment, at least one third rope leg is connected to said at least one first rope leg and said at least one second rope leg, said at least one third rope leg comprising an external load mass interface for attachment to an external load mass that is to be carried by said rotorcraft in operation.

According to a further preferred embodiment, said first rope leg comprises a first length adjustment unit that is adapted to shorten or lengthen said at least one first rope leg in operation on the basis of said associated operating parameters and said second rope leg comprises a second length adjustment unit that is adapted to shorten or lengthen said at least one second rope leg in operation on the basis of said associated operating parameters, wherein said first and second length adjustment units define a length adjustment device.

According to a further preferred embodiment, said first length adjustment unit and/or said second length adjustment unit is defined by a rope material having predefined lengthening properties for elastic elongation.

According to a further preferred embodiment, said rope material comprises polyamide.

According to a further preferred embodiment, said predefined lengthening properties are adapted to enable said length adjustment device to distribute a payload that is applied in operation to said external load mass rope to said at least one first rope leg and said at least one second rope leg such that said payload may exceed a maximum payload that is applicable to each one of said at least one first and second cargo hooks separately.

In such a configuration, the predefined lengthening properties for elastic elongation of the first and second rope legs define an underlying delta length that is achievable between these rope legs. Thus, the predefined lengthening properties must be considered such that the underlying delta length can be intercepted by the elongation of the external load mass rope, that a force applied to a relieved one of the first and second cargo hooks is still high enough to enlarge the overall external payload of the rotorcraft, and that a force applied to a charged one of the first and second cargo hooks is not greater than a rated load of this cargo hook. However, it should be noted that the smaller the elongation of the external load mass rope is, the longer the height thereof should be.

According to a further preferred embodiment, said first length adjustment unit and/or said second length adjustment unit comprises at least one spring coil damper having predefined dampening properties.

According to a further preferred embodiment, said predefined dampening properties are adapted to enable said length adjustment device to distribute a payload that is applied in operation to said external load mass rope to said at least one first rope leg and said at least one second rope leg such that said payload may exceed a maximum payload that is applicable to each one of said at least one first and second cargo hooks separately.

In such a configuration, the predefined dampening properties define an underlying delta length that is achievable between the first and second rope legs. Thus, the predefined dampening properties must be considered such that the delta length can be intercepted by the elongation of the external load mass rope, that a force applied to a relieved one of the first and second cargo hooks is still high enough to enlarge the overall external payload of the rotorcraft, and that a force applied to a charged one of the first and second cargo hooks is not greater than the rated load of this cargo hook.

According to a further preferred embodiment, said first length adjustment unit and/or said second length adjustment unit comprises at least one pulley block arrangement, wherein at least a part of said at least one first rope leg and/or said at least one second rope leg is enrolled on said at least one pulley block arrangement.

According to a further preferred embodiment, at least said part of said at least one first rope leg and/or said at least one second rope leg that is enrolled on said at least one pulley block arrangement comprises a rope material having predefined lengthening properties for elastic elongation, in particular polyamide.

According to a further preferred embodiment, said at least one pulley block arrangement comprises a plurality of pulleys on which said part of said at least one first rope leg and/or said at least one second rope leg is enrolled.

According to a further preferred embodiment, said at least one pulley block arrangement is adapted to enable said length adjustment device to distribute a payload that is applied in operation to said external load mass rope to said at least one first rope leg and said at least one second rope leg such that said payload may exceed a maximum payload that is applicable to each one of said at least one first and second cargo hooks separately.

In such a configuration, the construction of the pulley block arrangement with high elongation material defines an underlying delta length that is achievable between the first and second rope legs. Thus, the construction of the pulley block arrangement with high elongation material must be considered such that the underlying delta length can be intercepted by the elongation of the external load mass rope, that a force applied to a relieved one of the first and second cargo hooks is still high enough to enlarge the overall external payload of the rotorcraft, and that a force applied to a charged one of the first and second cargo hooks is not greater than a rated load of this cargo hook. However, it should be noted that the lower the elongation of the external load mass rope is, the longer the height of the pulley block arrangement or corresponding rope loops in the pulley block arrangement are.

According to a further preferred embodiment, said associated length adjustment unit comprises a guide pulley arrangement.

Advantageously, such a guide pulley arrangement moves on the first and second legs for adapting an underlying delta length between these rope legs until an equilibrium of force is reached in each leg.

According to a further preferred embodiment, said guide pulley arrangement comprises at least one guide pulley that is moveably arranged on said at least one first and second rope legs, said at least one guide pulley being adapted to move in operation on said first and second rope legs for shortening or lengthening said at least one of said first and second rope legs.

According to a further preferred embodiment, said at least one guide pulley is adapted to move in operation on said first and second rope legs for shortening or lengthening said at least one of said first and second rope legs in order to distribute a payload that is applied in operation to said external load mass rope to said at least one first rope leg and said at least one second rope leg such that said payload may exceed a maximum payload that is applicable to each one of said at least one first and second cargo hooks separately.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
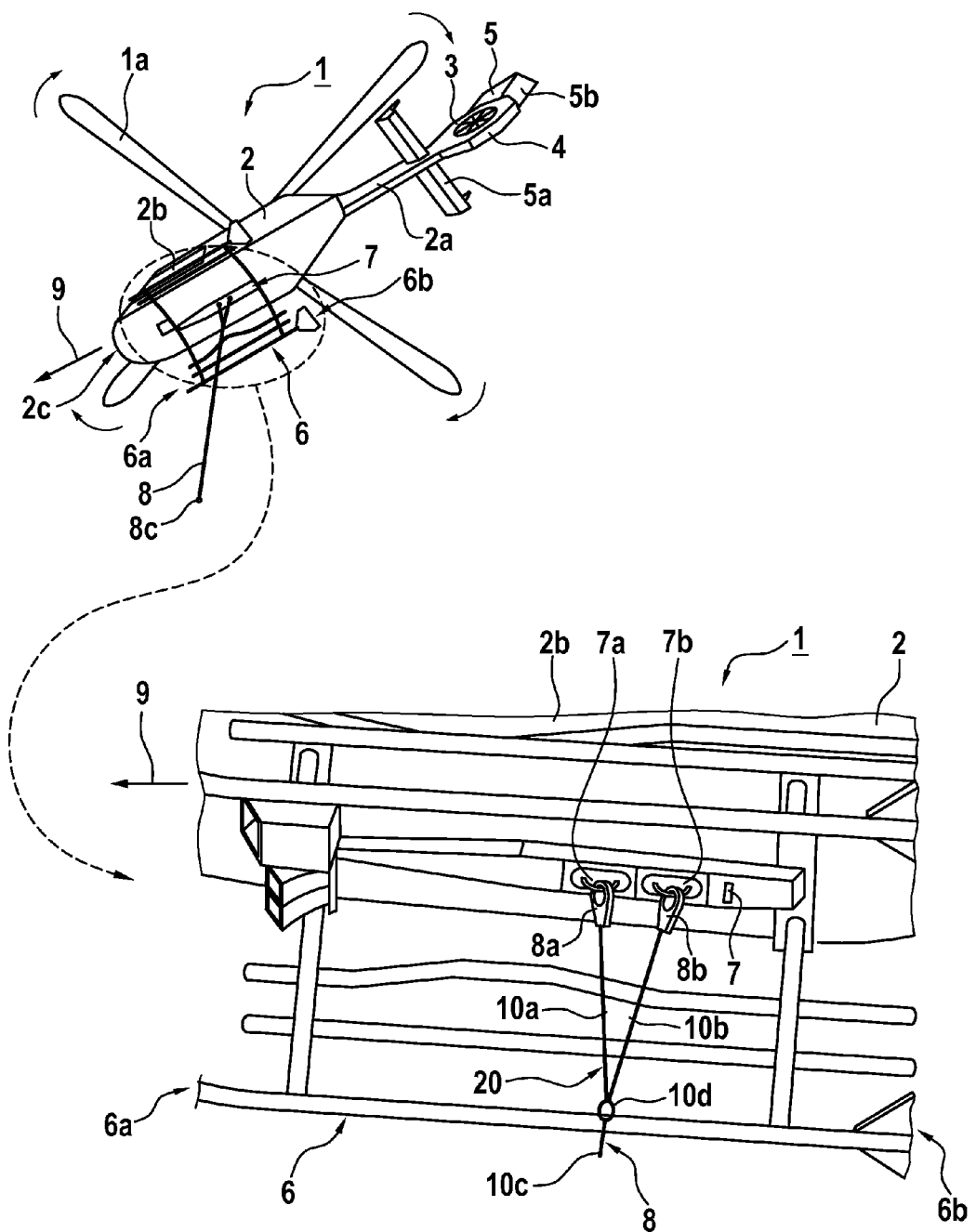
FIG. 1 shows a perspective view of a rotorcraft and an enlarged perspective view of a landing gear, a cargo hook device and an external load mass rope of said rotorcraft according to the invention.

FIG. 1 shows a rotorcraft 1 with a fuselage 2 that comprises a tail boom 2a and a cabin 2b defining a nose 2c of the fuselage 2. The rotorcraft 1 is by way of example embodied, and therefore hereinafter for simplicity also referred to, as a helicopter, which is illustratively shown in forward flight in a forward flight direction 9.

The helicopter 1 preferably comprises a landing gear 6 having in the forward flight direction 9 of the helicopter 1a forward end 6a and an aft end 6b, said landing gear 6 being rigidly attached to the fuselage 2. The helicopter 1 preferably further comprises at least one main rotor 1a configured to provide lift and forward or backward thrust during operation, and at least one preferably shrouded counter-torque device 3 configured to provide counter-torque during operation, i.e. to counter the torque created by rotation of the at least one main rotor 1a for purposes of balancing the helicopter 1 in terms of yaw.

The at least one counter-torque device 3 is illustratively provided at an aft section of the tail boom 2a, which preferably further comprises a bumper 4, a tail wing 5a and a fin 5 with a rudder 5b. The tail wing 5a is preferably adjustable in its inclination and can, thus, overtake the functioning of a horizontal stabilizer. Alternatively, or in addition, the helicopter 1 is provided with a suitable horizontal stabilizer. The rudder 5b is preferably adapted to provide for enhanced directional control of the helicopter 1 and can be deflected to large angles to reduce a given lateral drag of the fin 5 in sideward flight.

However, it should be noted that the at least one counter-torque device 3, the tail wing 5a as well as the fin 5 with the bumper 4 and the rudder 5b provided at the aft section of the tail boom 2a are merely described for illustrating one exemplary embodiment of the helicopter 1 and not for limiting the invention accordingly. Instead, the present invention as described hereinafter can likewise be applied to any helicopter, independent of a respective construction of the aft section thereof.

According to one embodiment, a cargo hook device 7 in double cargo hook arrangement defining two cargo hook attachment points 7a, 7b is mounted to the landing gear 6. Alternatively, the cargo hook device 7 can be attached directly to the fuselage 2 or the two cargo hook attachment points 7a, 7b can be provided directly at the fuselage 2.

The cargo hook device 7 is preferably adapted for attachment of an external load mass rope 8, preferentially by means of suitable attachment rings 8a, 8b. This external load mass rope 8 in turn is preferably at least adapted for suspending NHEC load masses from the helicopter 1 for transportation therewith, which can be attached to the external load mass rope 8 by means of an external load mass interface 8c, such as an attachment ring.

According to one embodiment, the external load mass rope 8 is implemented in the form of a so-called Y-rope having three rope legs 10a, 10b, 10c. The rope legs 10a, 10b preferably define a V-rope 20 and are, preferentially, interconnected by means of a leg interface 10d, such as an interconnection ring. More specifically, each one of the rope legs 10a, 10b is provided at one axial end with an associated attachment ring 8a, 8b, respectively, and at the other axial end it is attached to the leg interface 10d. Thus, the rope legs 10a, 10b form a V-shape and, therefore, define the V-rope 20 which is attached to the leg interface 10d. Furthermore, seen in the forward flight direction 9, the rope leg 10a defines a forward leg and the rope leg 10b defines an aft leg. Accordingly, the rope leg 10a is hereinafter referred to as the "forward leg 10a" and the rope leg 10b as the "aft leg 10b" for simplicity and clarity.

The rope leg 10c is preferably provided at one axial end with the external load mass interface 8c and at the other axial end it is preferably attached to the leg interface 10d. As the rope leg 10c is connected to the V-rope 20 by means of the leg interface 10d, the V-rope 20 and the rope leg 10c form a Y-shape, so that the external load mass rope 8 as such is implemented as a Y-rope. Accordingly, the external load mass rope 8 is hereinafter referred to as the "Y-rope 8" for brevity and conciseness. Furthermore, as the rope leg 10c can at least be attached via the external load mass interface 8c to a corresponding NHEC load mass and, thus, connects the latter to the V-rope 20, the rope leg 10c is hereinafter referred to as the "connection leg 10c".

Figure 2:
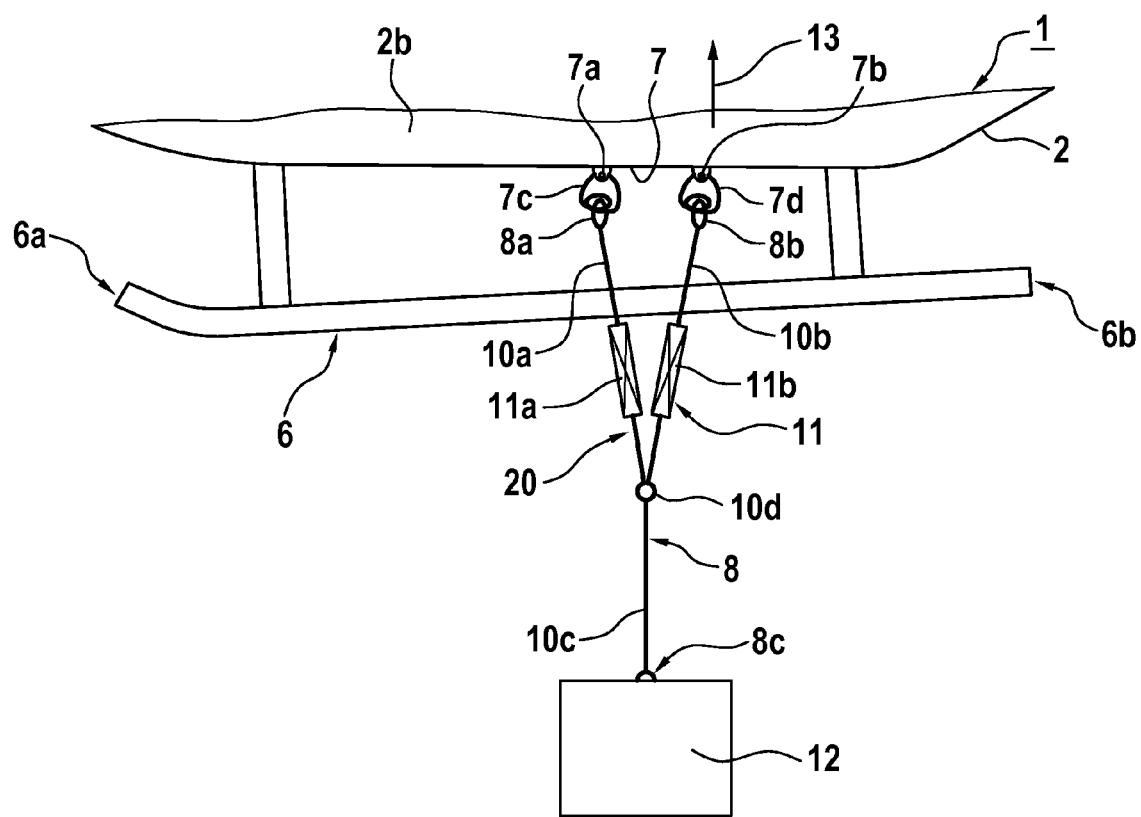
FIG. 2 shows a schematic side view of the landing gear, the cargo hook device and the external load mass rope of the rotorcraft of FIG. 1 in hover.

FIG. 2 shows the fuselage 2 of the helicopter 1 of FIG. 1 having the landing gear 6 with the cargo hook device 7 attached thereto. However, for simplicity and clarity of the drawings the cargo hook device 7 is merely represented schematically by means of the cargo hook attachment points 7a, 7b, where a first and a second cargo hook 7c, 7d are mounted to the cargo hook device 7.

Illustratively, the first and second cargo hooks 7c, 7d are connected with the Y-rope 8. More specifically, the forward leg 10a of the V-rope 20 is attached to the first cargo hook 7c by means of the attachment ring 8a and the aft leg 10b of the V-rope 20 is attached to the second cargo hook 7d by means of the attachment ring 8b. Furthermore, the connection leg 10c is connected by means of the external load mass interface 8c to an external load mass 12, in particular an NHEC load mass, by way of example.

According to one embodiment, the Y-rope 8 and, more specifically, the V-rope 20 comprises a length adjustment device 11 that is adapted to shorten or lengthen the V-rope 20 in operation on the basis of associated operating parameters, as described below with reference to FIG. 3. Preferably, at least one of the forward and aft legs 10a, 10b comprises a length adjustment unit that is associated with the length adjustment device 11 and adapted to shorten or lengthen the at least one of the forward and aft legs 10a, 10b in operation on the basis of the associated operating parameters. According to one aspect, the forward leg 10a comprises an associated length adjustment unit 11a and the aft leg 10b comprises an associated length adjustment unit 11b.

Figure 4:
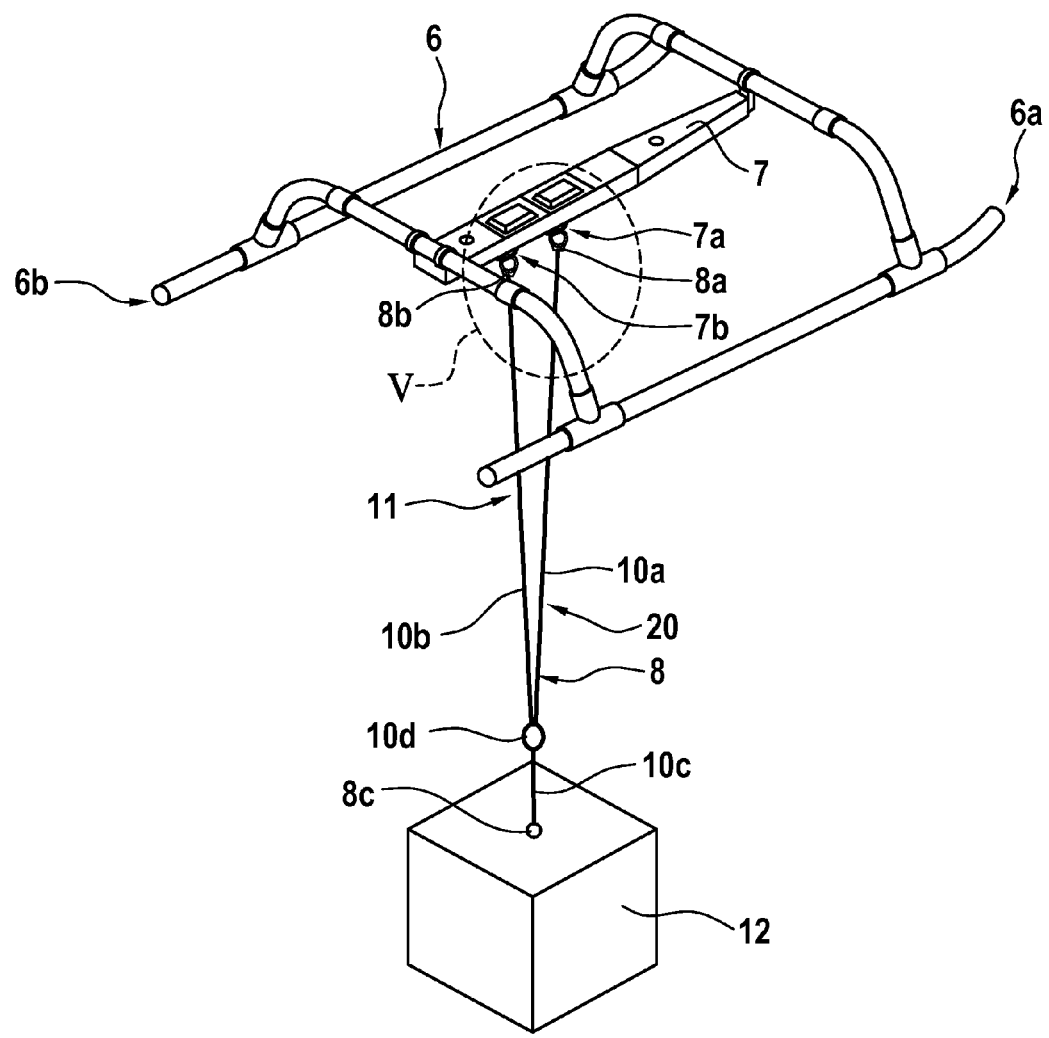
FIG. 4 shows a perspective view of the landing gear, the cargo hook device and the external load mass rope of the rotorcraft of FIG. 1 in a lifting operation and in hover.

When lifting the helicopter 1 in a lift direction 13, i.e. during picking up of the external load mass 12, both length adjustment units 11a, 11b are elongated into a force equilibrium position of the V-rope 20, i.e. until equilibrium of the force on each one of the forward and aft legs 10a, 10b occurs. This force equilibrium position is also adopted in hover of the helicopter 1, as illustrated in FIG. 4.

Figure 3:
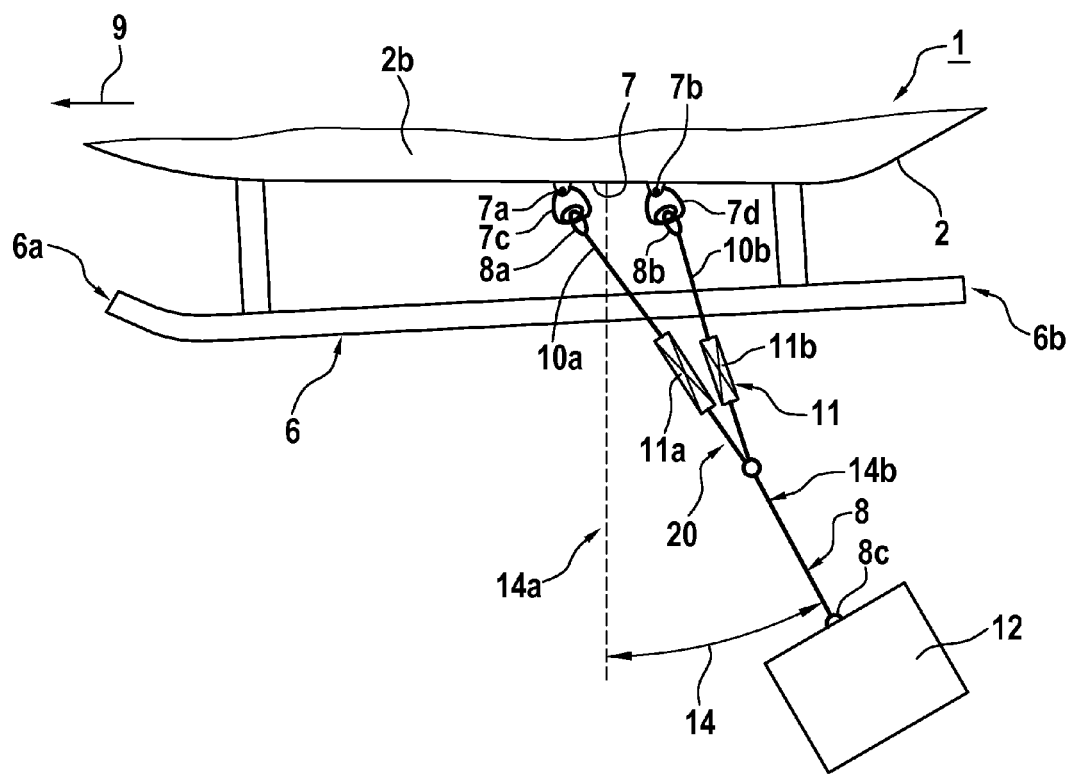
FIG. 3 shows a schematic side view of the landing gear, the cargo hook device and the external load mass rope of the rotorcraft of FIG. 1 in forward flight.

FIG. 3 shows the fuselage 2 of the helicopter 1 of FIG. 1 and FIG. 2 in forward flight of the helicopter 1 in the forward flight direction 9, by way of example. As described at FIG. 2, the fuselage 2 has the landing gear 6 with the cargo hook device 7 attached thereto and to the Y-rope 8, which in turn is attached to the external load mass 12.

In the forward flight of the helicopter 1, the length adjustment unit 11a is elongated and the length adjustment unit 11b is shortened, or vice versa in backward flight, as soon as the external load mass 12 starts to swing in the forward flight direction 9 or an adverse aft direction. More specifically, as soon as the external load mass 12 starts to swing in the forward flight of the helicopter 1, it is deflected from an associated lift position 14a into an associated flight position 14b with an associated deflection angle 14 of e.g. up to 30°, as defined as maximum in the FAR 27/29.865, and the forward leg 10a will be elongated while the aft leg 10b will be shortened. Illustratively, the associated deflection angle 14 comprises approximately 30°.

It should, however, be noted that even if in the forward flight higher deflection angles than 30° are possible, they will not occur with comparatively heavy loads. Only for light loads with a high air drag the external load mass 12 may swing beyond the 30°, but this has no effect on the function of the inventive Y-rope 8.

However, by the swinging of the external load mass 12, the force equilibrium described above with reference to FIG. 2 is disturbed and the elongation of the length adjustment unit 11a and the shortening of the length adjustment 11b takes place until the sum of the force on the forward and aft legs 10a, 10b of the V-rope 20 corresponds to the force that is exerted on the Y-rope 8 by the external load mass 12, so that a new force equilibrium occurs such that the external load mass 12 remains in the associated flight position 14b. This is applicable for the longitudinally arranged cargo hooks 7c, 7d. Based on this new force equilibrium of the forward and aft legs 10a, 10b, the load mass applied on both cargo hooks 7c, 7d is less than the load mass that would be applied directly to a single cargo hook.

FIG. 4 shows the landing gear 6 of the helicopter 1 of FIG. 1 and FIG. 2, which is by way of example represented in hover of the helicopter 1. As described at FIG. 2, the landing gear 6 has the cargo hook device 7 attached thereto and to the Y-rope 8, which in turn is attached to the external load mass 12. The Y-rope 8 and, more specifically, the V-rope 20 comprises the length adjustment device 11, which is embodied according to a first embodiment that is described in more detail below at FIG. 7 with a rope material having predefined lengthening properties for elastic elongation, such as polyamide.

Figure 5:
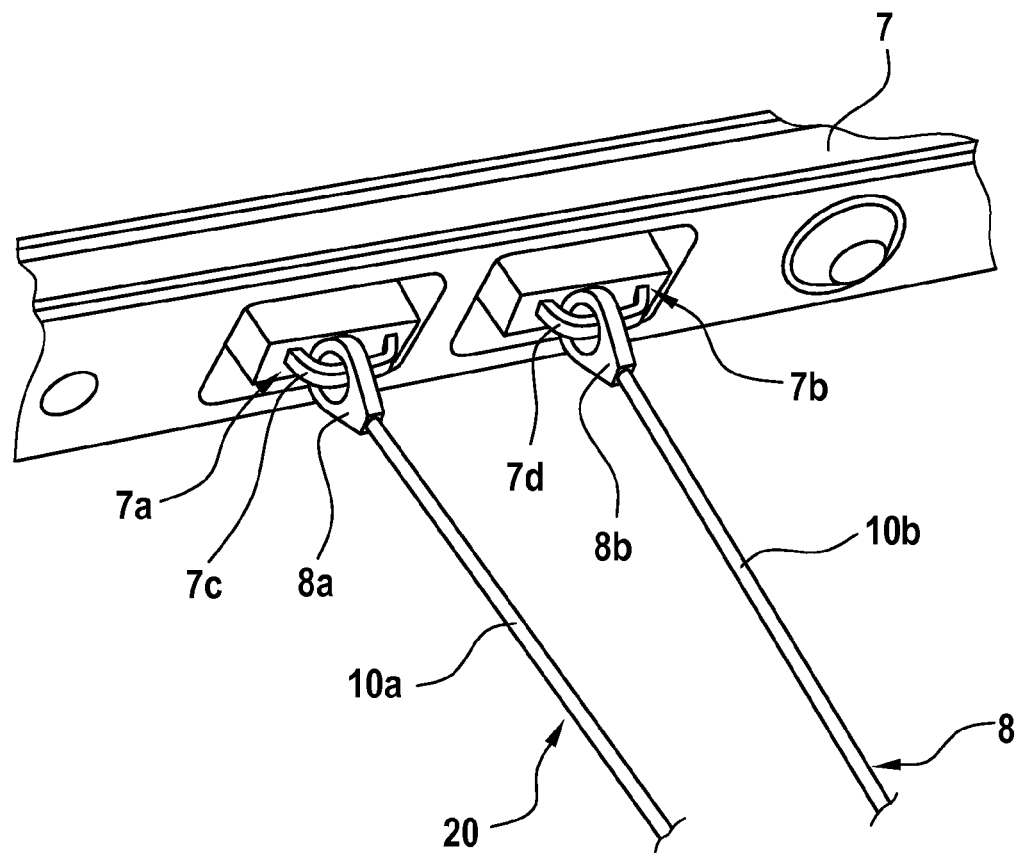
FIG. 5 shows an enlarged cutout of the cargo hook device and the external load mass rope of FIG. 4.

FIG. 5 shows the cargo hook attachment points 7a, 7b of the cargo hook device 7 of FIG. 4 in greater detail, which are provided with the cargo hooks 7c, 7d, respectively. Furthermore, the attachment rings 8a, 8b of the forward and aft legs 10a, 10b of the V-rope 20 of FIG. 4, which are attached to the cargo hooks 7c, 7d, respectively, are also shown in greater detail.

Figure 6:
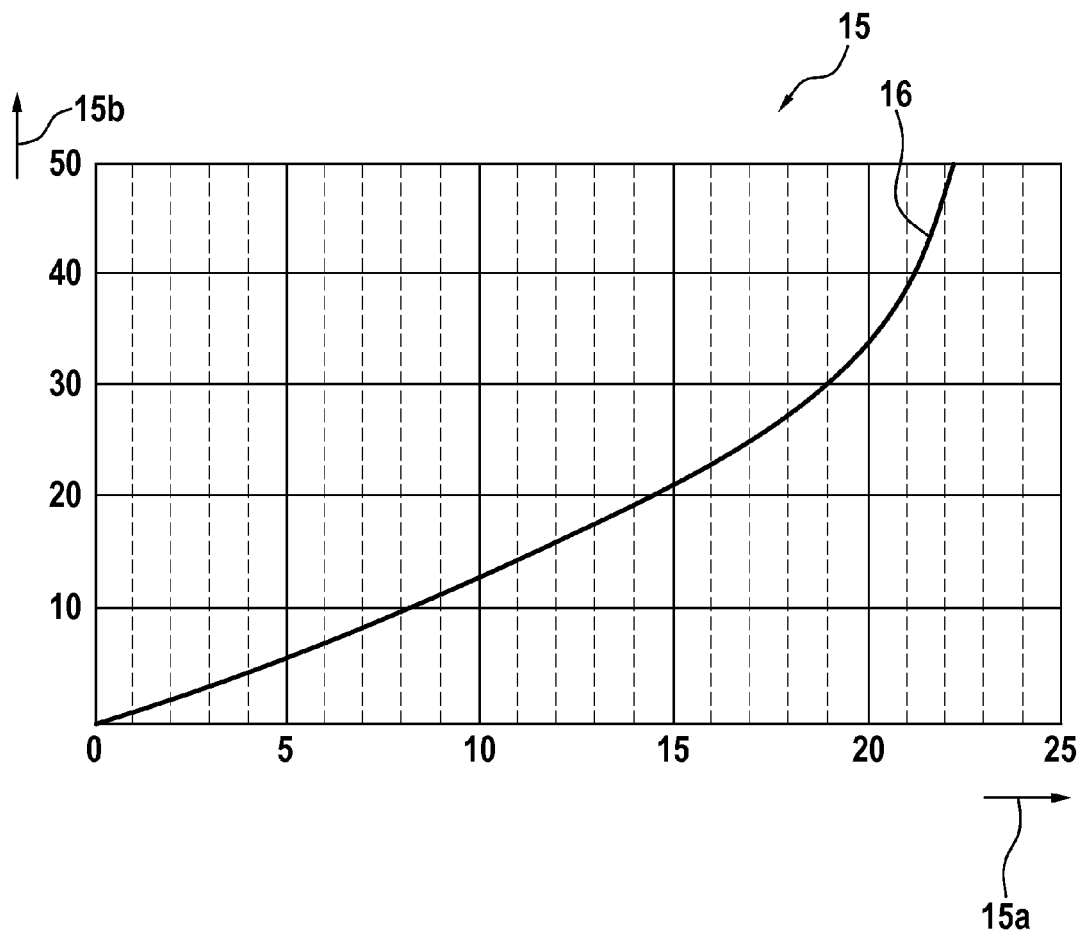
FIG. 6 shows a characteristic diagram of an exemplary rope in operation.

FIG. 6 shows an exemplary characteristic diagram 15 with a length adjustment characteristic graph 16 of an exemplary rope in operation that can be used for realisation of the V-rope 20 of FIG. 4 and FIG. 5. This characteristic diagram 15 comprises an axis of abscissae 15a showing elongation rates of the exemplary rope that are given as percentages, and an axis of ordinates 15b showing loads applied to the exemplary rope that are given as percentages of an underlying breaking load thereof.

More specifically, the exemplary rope preferably comprises a rope material having predefined lengthening properties for elastic elongation. It should be noted that suitable ropes are well-known to the person skilled in the art and that currently ropes are available with an elongation comprised between 5% and 10% at 10% breaking load. Such ropes could advantageously be adapted for use with the V-rope 20.

For instance, the exemplary rope is realized with a breaking load of 231000 N and a safety factor of 10 using GeoOne Polyamide with a diameter of 32 mm, having an elongation rate at 10% of its breaking load, which can be derived from the length adjustment characteristic graph 16 as being approximately 8.2%. Assuming that the V-rope 20 has a length or height of 3000 mm, the V-rope 20 would be lengthened at this elongation rate of 8.2% by 246 mm.

According to one embodiment, the V-rope 20 is realized using this exemplary rope and, therefore, hereinafter referred to as the "exemplary V-rope 20". Preferably, each one of the forward and aft legs 10a, 10b of the exemplary V-rope 20 is embodied by this exemplary rope.

In an exemplary operation, the exemplary V-rope 20 is used for transporting a load mass of 2.2 tons. Accordingly, a payload of 11000 N can be measured on each one of the forward and aft legs 10a, 10b of the exemplary V-rope 20 in lifting operation or hover of the helicopter 1 according to FIG. 2 and FIG. 4. In forward flight of the helicopter 1 according to FIG. 3, i.e. with the deflection angle 14 of approximately 30°, it can be measured that the forward leg 10a of the exemplary V-rope 20 is lengthened by approximately 75 mm and that its aft leg 10b is shortened by approximately 75 mm, so that a total length difference between the forward leg 10a and the aft leg 10b of approximately 150 mm can be measured.

Based on these measurement values, a resulting force RFFH on the cargo hook 7c, to which the forward leg 10a of the exemplary V-rope 20 is attached, can be determined to:

$$RFFH = 11000\ N + \left(\frac{75\ mm \times 11000\ N}{246\ mm}\right) = \underline{14354\ N}$$

and a resulting force RFAH on the cargo hook 7d, to which the aft leg 10b of the exemplary V-rope 20 is attached, can be determined to:

$$RFAH = 11000\ N - \left(\frac{75\ mm \times 11000\ N}{246\ mm}\right) = \underline{7646\ N}$$

In other words, the maximum payload that is applied to one of the two cargo hooks 7c, 7d when transporting a load mass of 2.2 tons with the exemplary V-rope 20 amounts to less than 15000 N. Assuming now that commonly used cargo hooks are designed for an applicable payload of 17000 N, i.e. for transportation of a load mass of at most 1.7 tons, such a commonly used cargo hook can be used in double cargo hook arrangement with the inventive Y-rope 8 having the exemplary V-rope 20 for transportation of a load mass of 2.2 tons and even more, as the payload applied to each such cargo hook would be lower than the applicable payload of 17000 N, and in the present example even lower than 15000 N.

Figure 7:
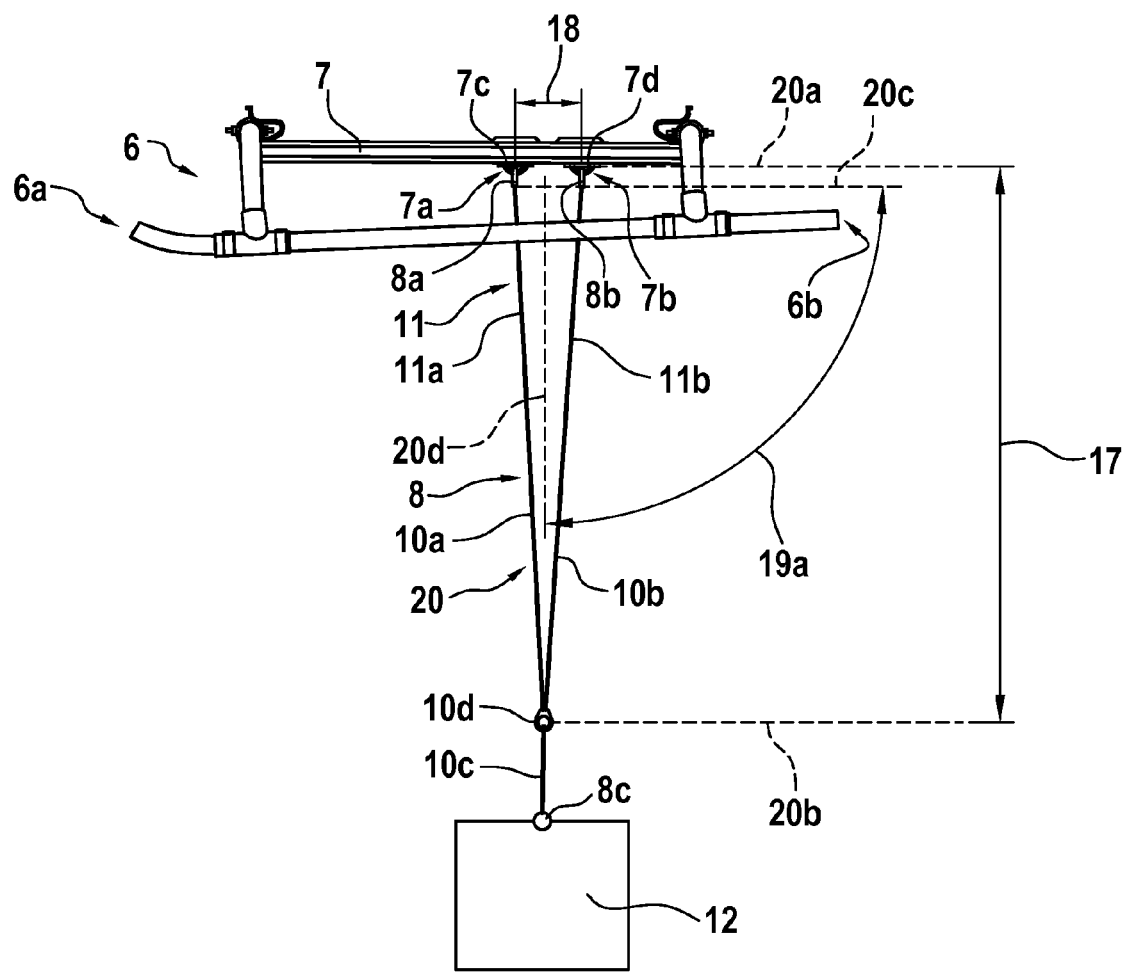
FIG. 7 shows a side view of the landing gear, the cargo hook device and the external load mass rope according to a first embodiment of the rotorcraft of FIG. 1 in hover.

FIG. 7 shows the landing gear 6 of the helicopter 1 of FIG. 1 and FIG. 2, which is by way of example represented in hover of the helicopter 1 according to FIG. 4, with the cargo hook device 7 that is attached to the landing gear 6 and to the Y-rope 8, which in turn is attached to the external load mass 12. Preferably, the Y-rope 8 comprises the exemplary V-rope 20 of FIG. 6.

Illustratively, the V-rope 20 has a height 17 that is defined between a V-rope upper end line 20a that is defined by the cargo hook attachment points 7a, 7b, and a V-rope lower end line 20b that is defined by the leg interface 10d. Furthermore, the V-rope 20 has an associated pivot points line 20c that is defined by respective pivot points of the attachment rings 8a, 8b of the forward and aft legs 10a, 10b. Moreover, a V-rope center line 20d can be defined, which illustratively corresponds to a fictive prolongation of the connection leg 10c. This V-rope center line 20d and the pivot points line 20c illustratively encompass a connection leg hover angle 19a, which illustratively amounts to 90° and which decreases when the external load mass 12 starts to swing as described above.

As described at FIG. 4, the Y-rope 8 and, more specifically, the V-rope 20 comprises the length adjustment device 11, which is embodied according to the first embodiment with a rope material having predefined lengthening properties for elastic elongation. Preferably, each one of the length adjustment units 11a, 11b of the length adjustment device 11 is embodied according to the first embodiment, i.e. with the rope material having predefined lengthening properties for elastic elongation.

According to one aspect, at least one and preferably both of the length adjustment units 11a, 11b according to the first embodiment comprise a shortening and lengthening (or elongating) capacity that is defined as a function of a predetermined clearance 18 between the two cargo hooks 7c, 7d. This predetermined clearance 18 between the two cargo hooks 7c, 7d is on the one hand limited by the design of each one of the two cargo hooks 7c, 7d in order to allow free movement of both cargo hooks 7c, 7d relative to each other without clashing against each other, and on the other hand by the center of gravity movement if one of the two cargo hooks 7c, 7d inadvertently releases in operation. However, it should be noted that the greater the predetermined clearance 18 is, the greater the total length difference described at FIG. 6 between the forward and aft legs 10a, 10b would be in operation.

As mentioned above at FIG. 2, a corresponding shortening or lengthening as described above at FIG. 6 is preferably performed in operation on the basis of the associated operating parameters. This shortening or lengthening is generally intended for distributing a payload that is applied to the Y-rope 8 to the forward leg 10a and the aft leg 10b, preferentially such that this payload may exceed a maximum payload that is applicable to each one of the two cargo hooks 7c, 7d separately. The associated operating parameters preferably comprise at least weight and dimensions of the external load mass 12 and/or the external load mass deflection angle 14 of FIG. 3.

Figure 8:
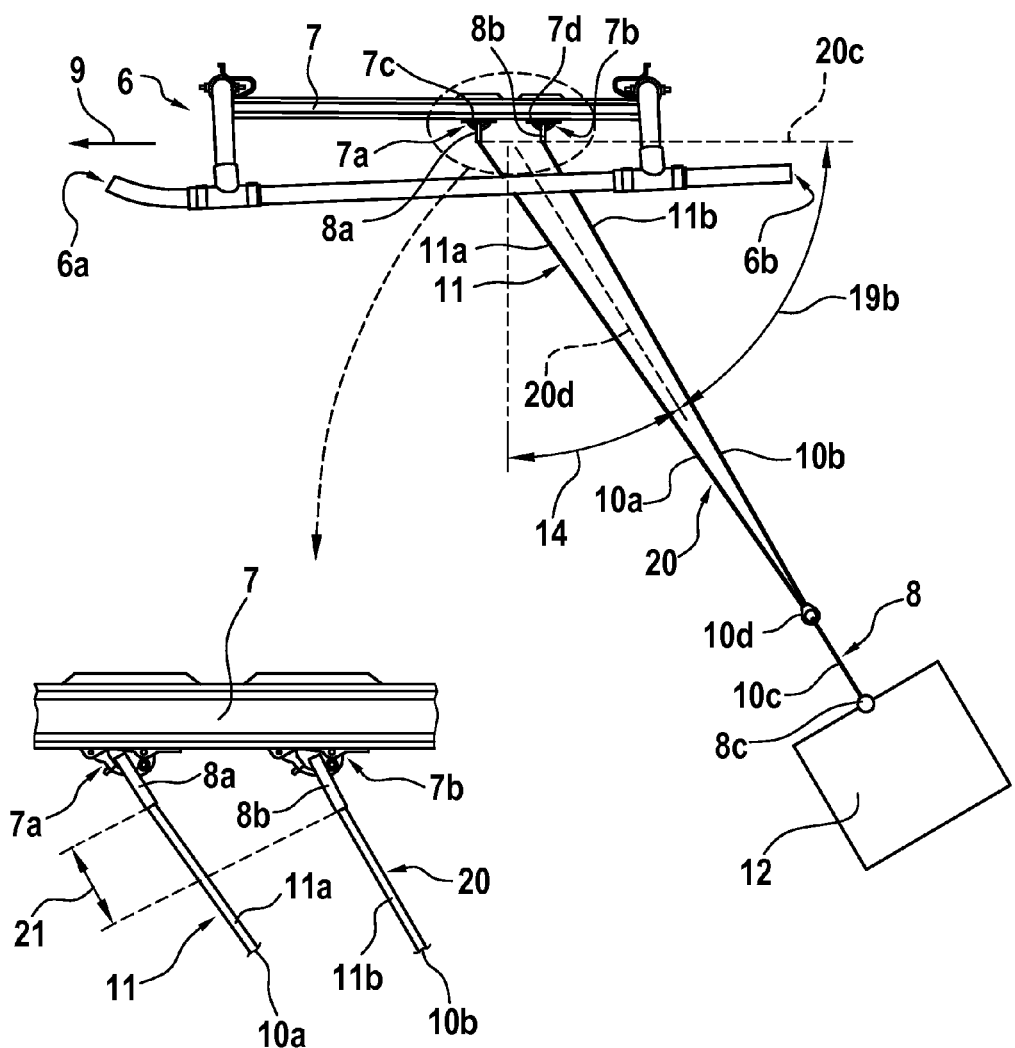
FIG. 8 shows a side view of the landing gear, the cargo hook device and the external load mass rope according to the first embodiment of the rotorcraft of FIG. 1 in forward flight, and an enlarged cutout of the cargo hook device and the external load mass rope.

FIG. 8 shows according to FIG. 7 the landing gear 6 with the cargo hook device 7 that is attached to the latter and to the Y-rope 8, which in turn is attached to the external load mass 12, but now in forward flight of the helicopter 1 of FIG. 1 and FIG. 2. In this forward flight into the forward flight direction 9, the external load mass 12 swings in the direction of the aft end 6b of the landing gear 6, thereby decreasing the connection leg hover angle 19a of FIG. 7 into a connection leg flight angle 19b, which defines together with the deflection angle 14 of FIG. 3 the connection leg hover angle 19a.

Furthermore, in the forward flight, the forward leg 10a and the aft leg 10b exhibit a length difference due to the functioning of the length adjustment units 11a, 11b. This length difference is also referred to as the V-rope delta length and designated by the reference numeral 21. This delta length 21 depends on several operating parameters, including the external load mass 12, the deflection angle 14, the predefined clearance 18 of FIG. 7 and the predefined lengthening properties for elastic elongation of the underlying rope material.

Figure 9:
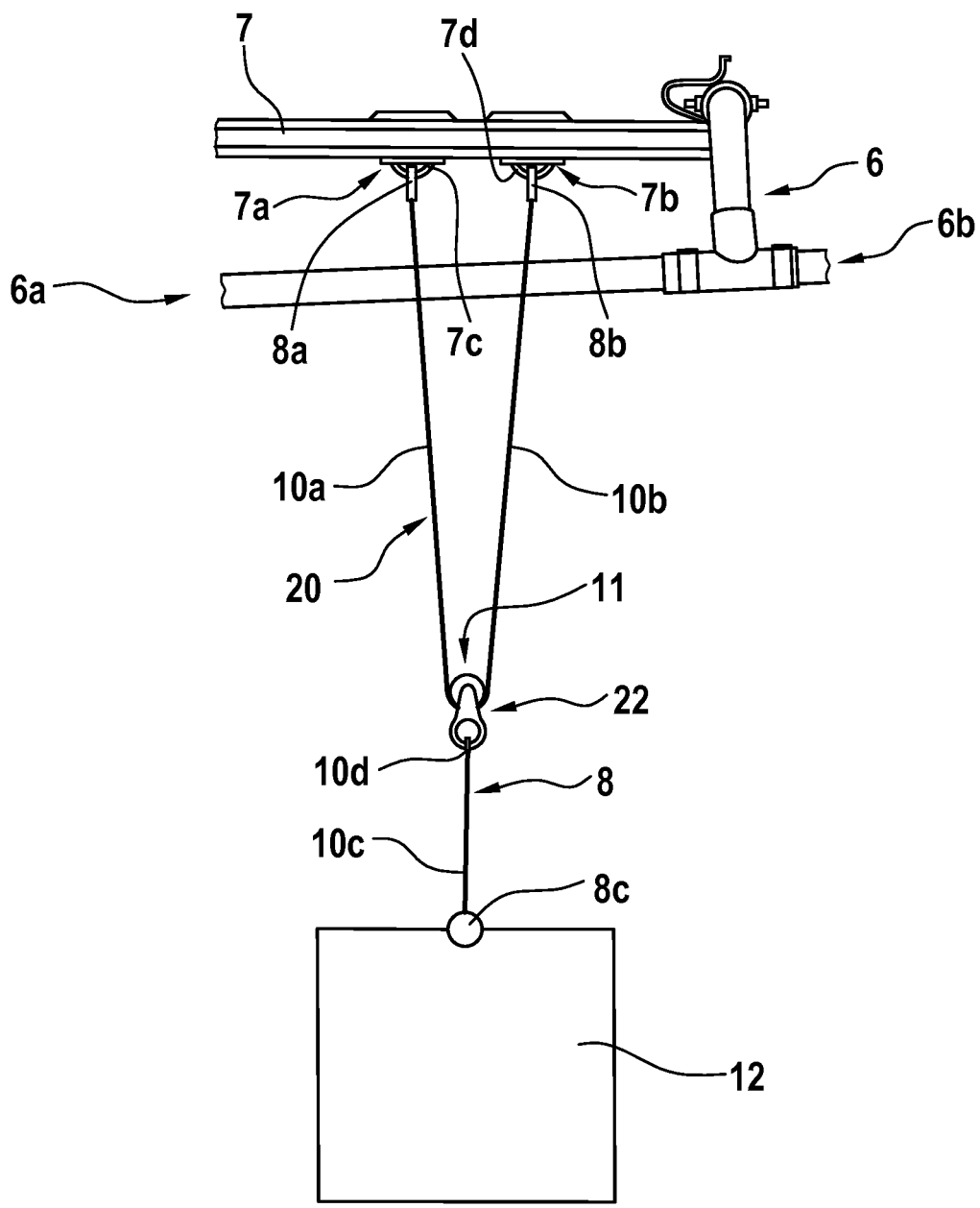
FIG. 9 shows a side view of the landing gear, the cargo hook device and the external load mass rope according to a second embodiment of the rotorcraft of FIG. 1 in hover.

FIG. 9 shows the landing gear 6 of the helicopter 1 of FIG. 1 and FIG. 2, which is by way of example represented in hover of the helicopter 1 according to FIG. 7 with the cargo hook device 7 that is attached to the landing gear 6 and to the Y-rope 8, which in turn is attached to the external load mass 12. However, in contrast to FIG. 7, the V-rope 20 is now formed in one piece, i.e. without being separated into two parts by the leg interface 10d. Furthermore, the length adjustment device 11 of the Y-rope 8 and, more specifically, of the V-rope 20 is now embodied according to a second embodiment with a guide pulley arrangement 22 instead of the rope material having the predefined lengthening properties for elastic elongation. The guide pulley arrangement 22 is described in more detail below with reference to FIG. 10.

Figure 10:
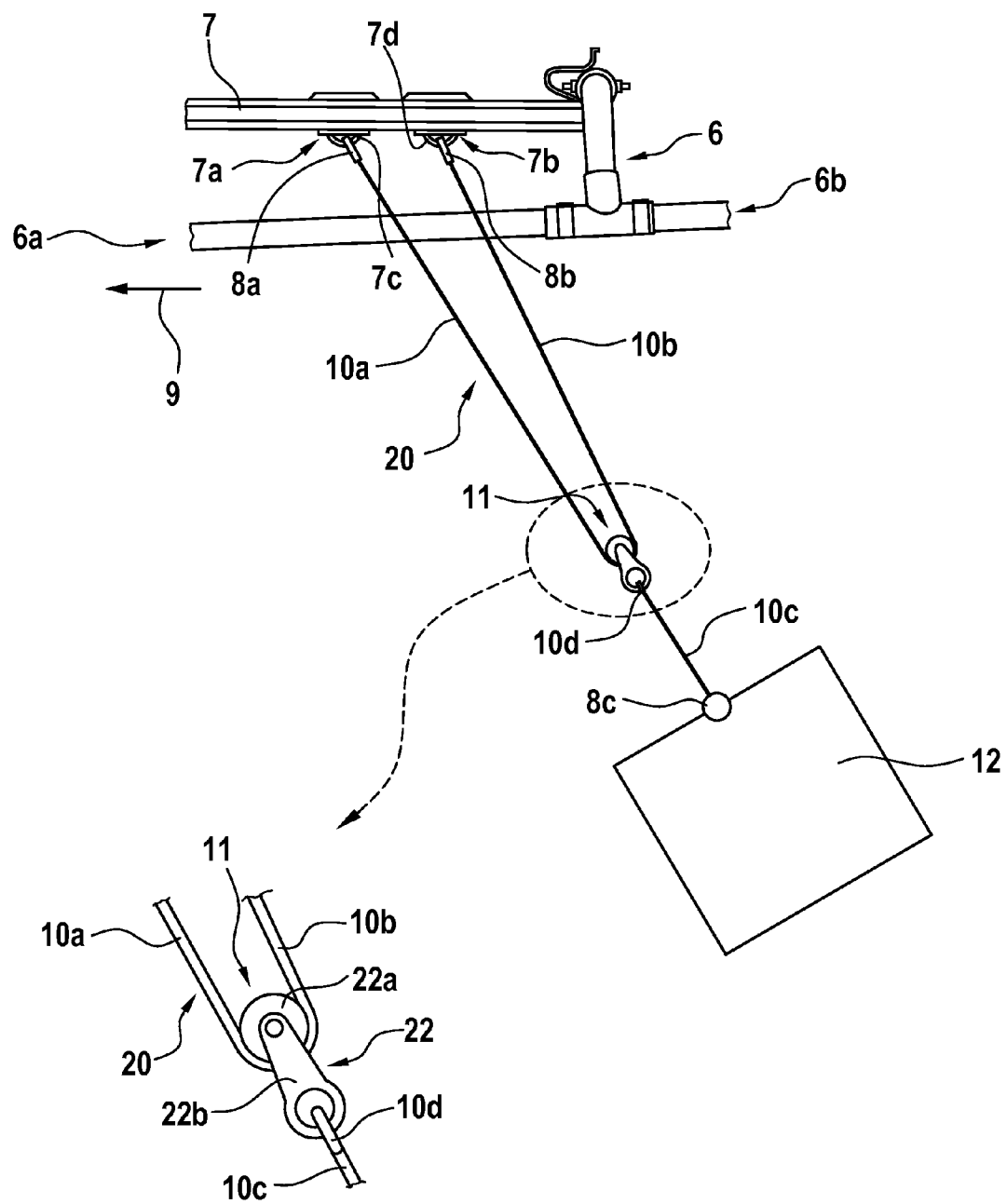
FIG. 10 shows a side view of the landing gear, the cargo hook device and the external load mass rope according to the second embodiment of the rotorcraft of FIG. 1 in forward flight, and an enlarged cutout of the cargo hook device and the external load mass rope.

FIG. 10 shows according to FIG. 9 the landing gear 6 with the cargo hook device 7 that is attached to the latter and to the Y-rope 8, which in turn is attached to the external load mass 12, but now in forward flight of the helicopter 1 of FIG. 1 and FIG. 2. In this forward flight into the forward flight direction 9, the external load mass 12 is deflected as described above at FIG. 8 and the associated payload is distributed to the forward and aft legs 10a, 10b of the V-rope 20 via the guide pulley arrangement 22.

More specifically, the guide pulley arrangement 22 preferably comprises at least one guide pulley 22a that is moveably arranged on the V-rope 20 and, thus, on the forward and aft legs 10a, 10b. The at least one guide pulley 22a is connected via an associated connecting interface 22b to the leg interface 10d, which in turn is connected to the connection leg 10c of the Y-rope 8.

In operation, the at least one guide pulley 22a moves on the V-rope 20 and, thus, on the forward and aft legs 10a, 10b such that one of these legs 10a, 10b is shortened while the other one is lengthened, in order to distribute a payload that is applied by the external load mass 12 to the Y-rope 8 to the forward leg 10a and the aft leg 10b, preferentially such that this payload may exceed a maximum payload that is applicable to each one of the two cargo hooks 7c, 7d separately. Illustratively, in the forward flight the forward leg 10a is lengthened and the aft leg 10b is shortened.

Figure 11:
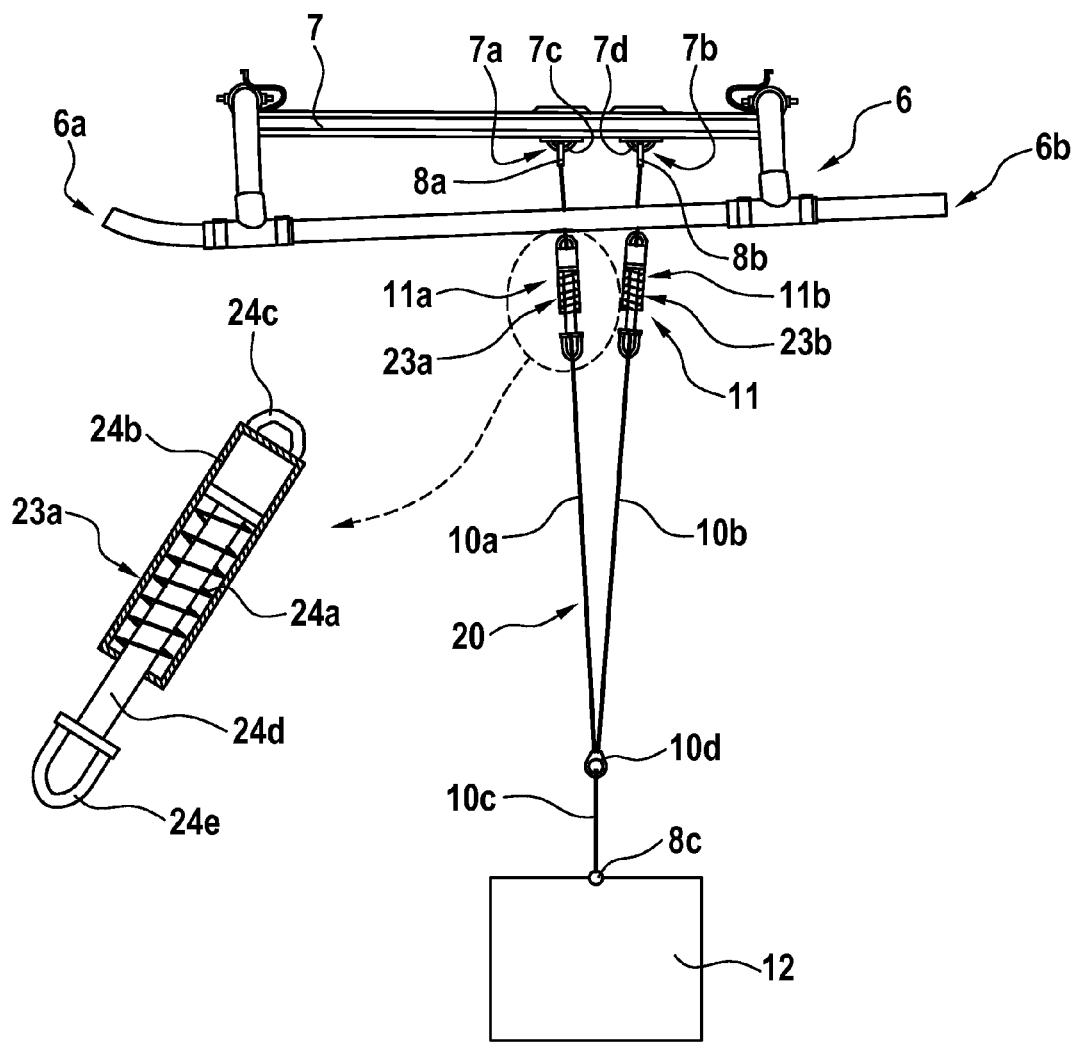
FIG. 11 shows a side view of the landing gear, the cargo hook device and the external load mass rope according to a third embodiment of the rotorcraft of FIG. 1 in hover, and an enlarged cutout of the external load mass rope.

FIG. 11 shows the landing gear 6 of the helicopter 1 of FIG. 1 and FIG. 2, which is by way of example represented in hover of the helicopter 1 according to FIG. 7 with the cargo hook device 7 that is attached to the landing gear 6 and to the Y-rope 8, which in turn is attached to the external load mass 12. However, in contrast to FIG. 7, the length adjustment device 11 of the Y-rope 8 and, more specifically, of the V-rope 20 is now embodied according to a third embodiment with at least one spring coil damper 23a, 23b having predefined dampening properties, instead of the rope material having the predefined lengthening properties for elastic elongation.

Preferably, each one of the length adjustment units 11a, 11b of the length adjustment device 11 is embodied according to the third embodiment, i.e. with at least one spring coil damper 23a, 23b having predefined dampening properties. Illustratively, the length adjustment unit 11a of the forward leg 10a of the V-rope 20 has a spring coil damper 23a and the length adjustment unit 11b of the aft leg 10b of the V-rope 20 has a spring coil damper 23b.

According to one aspect, the spring coil damper 23a comprises a housing 24b that is provided with a first connection hook 24c for connection to the forward leg 10a. Inside the housing 24b, a spring coil 24a, preferably a carbon spring coil, is arranged. Illustratively, the spring coil 24a is mounted to a piston 24d, which is provided with a second connection hook 24e for connection to the forward leg 10a.

It should be noted that the spring coil damper 23a can be arranged at any position along the forward leg 10a, which is in FIG. 11 only illustratively selected as being directly below the landing gear 6. To this end, the forward leg 10a is divided into two parts that are separately attached to the first and second connection hooks 24c, 24e of the spring coil damper 23a.

It should further be noted that the spring coil damper 23b is preferably embodied similar to the spring coil damper 23a. Thus, a more detailed description of the spring coil damper 23b is omitted hereinafter for brevity and conciseness.

As mentioned above, the spring coil dampers 23a, 23b have predefined dampening properties which are preferentially adapted to enable these spring coil dampers 23a, 23b to distribute a payload that is applied in operation to the Y-rope 8 to the forward leg 10a and the aft leg 10b, preferentially such that this payload may exceed a maximum payload that is applicable to each one of the two cargo hooks 7c, 7d separately. Preferably, the predefined dampening properties are such that the spring coil dampers 23a, 23b are not completely extended in hover or when lifting the external load mass 12, so that they can be further extended in forward flight, as described below with reference to FIG. 12.

Figure 12:
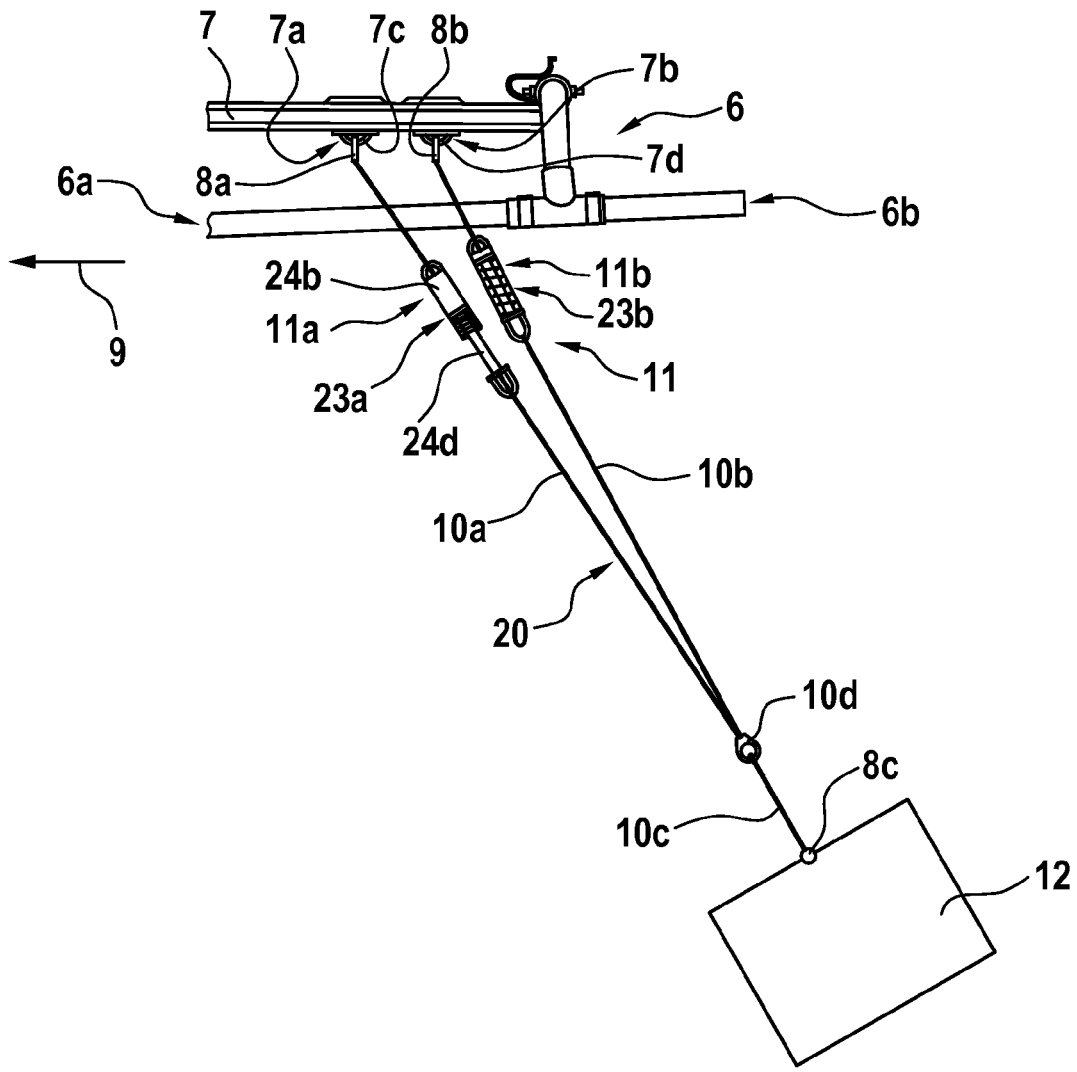
FIG. 12 shows a side view of the landing gear, the cargo hook device and the external load mass rope according to the third embodiment of the rotorcraft of FIG. 1 in forward flight.

FIG. 12 shows according to FIG. 11 the landing gear 6 with the cargo hook device 7 that is attached to the latter and to the Y-rope 8, which in turn is attached to the external load mass 12, but now in forward flight of the helicopter 1 of FIG. 1 and FIG. 2. In this forward flight into the forward flight direction 9, the external load mass 12 is deflected as described above at FIG. 8 and the associated payload is distributed to the forward and aft legs 10a, 10b of the V-rope 20 via the spring coil dampers 23a, 23b.

As illustrated in FIG. 12, the spring coil damper 23a provided with the forward leg 10a is comparatively more extended in forward flight than in hover and the spring coil damper 23b provided with the aft leg 10b is comparatively less extended in forward flight than in hover. In other words, compared to the FIG. 11, the spring coil damper 23a is lengthened while the spring coil damper 23b is shortened.

Figure 13:
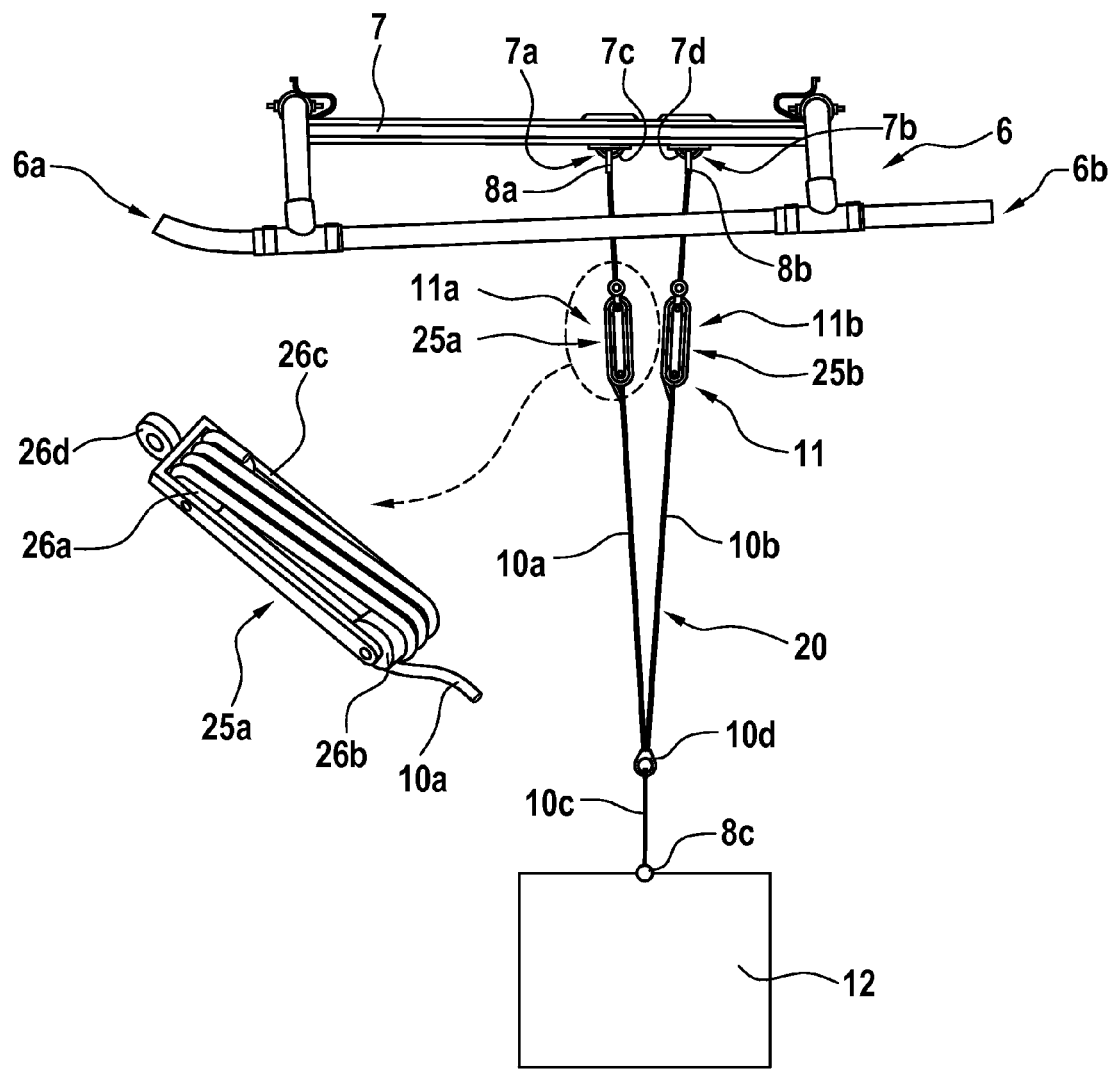
FIG. 13 shows a side view of the landing gear, the cargo hook device and the external load mass rope according to a fourth embodiment of the rotorcraft of FIG. 1 in hover, and an enlarged cutout of the external load mass rope.

FIG. 13 shows the landing gear 6 of the helicopter 1 of FIG. 1 and FIG. 2, which is by way of example represented in hover of the helicopter 1 according to FIG. 7 with the cargo hook device 7 that is attached to the landing gear 6 and to the Y-rope 8, which in turn is attached to the external load mass 12. However, in contrast to FIG. 7, the length adjustment device 11 of the Y-rope 8 and, more specifically, of the V-rope 20 is now embodied according to a fourth embodiment with at least one pulley block arrangement 25a, 25b, instead of the rope material having the predefined lengthening properties for elastic elongation.

Preferably, each one of the length adjustment units 11a, 11b of the length adjustment device 11 is embodied according to the fourth embodiment, i.e. with at least one pulley block arrangement 25a, 25b. Illustratively, the length adjustment unit 11a of the forward leg 10a of the V-rope 20 has a pulley block arrangement 25a and the length adjustment unit 11b of the aft leg 10b of the V-rope 20 has a pulley block arrangement 25b. Furthermore, at least a part of the forward or aft legs 10a, 10b is respectively enrolled on the associated pulley block arrangements 25a, 25b. Preferably, at least this part comprises a rope material having predefined lengthening properties for elastic elongation, in particular polyamide.

According to one aspect, the pulley block arrangement 25a comprises a plurality of upper and lower pulleys 26a, 26b, on which the part of the forward leg 10a is enrolled. These upper and lower pulleys 26a, 26b are oppositely arranged in an associated pulley supporting frame 26, which is provided with a connection hook 26d for connection to the forward leg 10a.

It should be noted that the pulley block arrangement 25a can be arranged at any position along the forward leg 10a, which is in FIG. 13 only illustratively selected as being directly below the landing gear 6. To this end, the forward leg 10a is divided into two parts, one of which is attached to the connection hook 26d while the other one is enrolled on the upper and lower pulleys 26a, 26b and, e.g., fixedly attached to one of these pulleys 26a, 26b.

It should further be noted that the pulley block arrangement 25b is preferably embodied similar to the pulley block arrangement 25a. Thus, a more detailed description of the pulley block arrangement 25b is omitted hereinafter for brevity and conciseness.

According to one aspect, the pulley block arrangements 25a, 25b are adapted to distribute a payload that is applied in operation to the Y-rope 8 to the forward leg 10a and the aft leg 10b, preferentially such that this payload may exceed a maximum payload that is applicable to each one of the two cargo hooks 7c, 7d separately. Preferably, the pulley block arrangements 25a, 25b are not fully unrolled in hover or when lifting the external load mass 12, so that they can be further unrolled in forward flight, as illustrated in FIG. 14.

Figure 14:
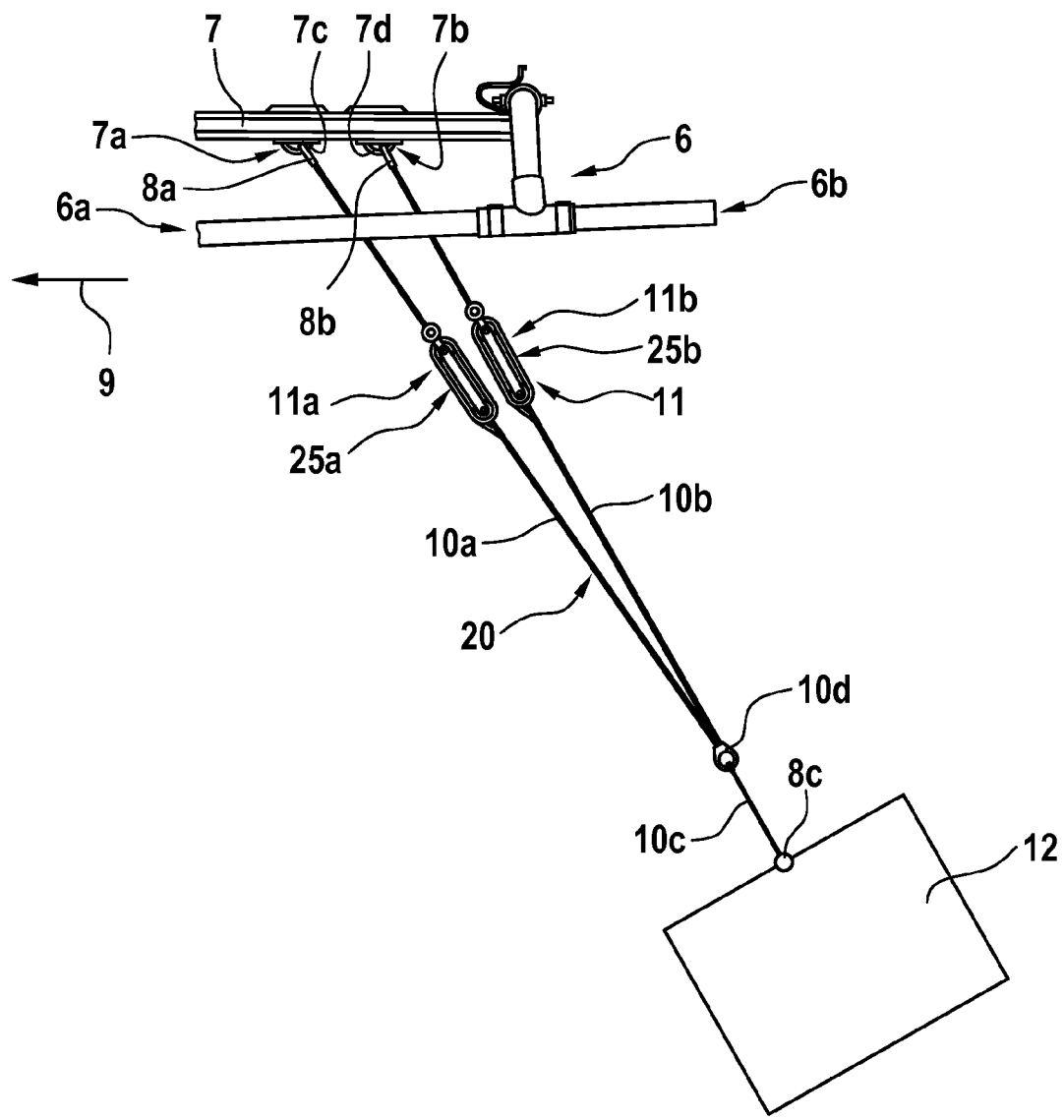
FIG. 14 shows a side view of the landing gear, the cargo hook device and the external load mass rope according to the fourth embodiment of the rotorcraft of FIG. 1 in forward flight.

FIG. 14 shows according to FIG. 13 the landing gear 6 with the cargo hook device 7 that is attached to the latter and to the Y-rope 8, which in turn is attached to the external load mass 12, but now in forward flight of the helicopter 1 of FIG. 1 and FIG. 2. In this forward flight into the forward flight direction 9, the external load mass 12 is deflected as described above at FIG. 8 and the associated payload is distributed to the forward and aft legs 10a, 10b of the V-rope 20 via the pulley block arrangements 25a, 25b. Thereby, the forward leg 10a is lengthened by the pulley block arrangement 25a and the aft leg 10b is shortened by the pulley block arrangement 25b, compared to FIG. 13.

It should be noted that modifications to the above described embodiments are within the common knowledge of the person skilled in the art and, thus, also considered as being part of the present invention. For instance, combinations of the above described embodiments can be realized, where the forward leg 10a is e.g. provided with a length adjustment unit according to the first embodiment, while the aft leg 10b is provided with a length adjustment unit according to the third embodiment, or the forward leg 10a is e.g. provided with a length adjustment unit according to the first embodiment and a length adjustment unit according to the third embodiment, and so on.

REFERENCE LIST 1 rotorcraft
1a main rotor
2 fuselage
2a tail boom
2b cabin
2c fuselage nose
3 counter-torque device
4 bumper
5 fin
5a tail wing
5b rudder
6 landing gear
6a landing gear forward end
6b landing gear aft end
7 cargo hook device
7a, 7b cargo hook attachment points
7c, 7d cargo hooks
8 external load mass rope
8a, 8b external load mass rope attachment rings
8c external load mass interface
9 forward flight direction
10a external load mass rope forward leg
10b external load mass rope aft leg
10c external load mass rope connection leg
10d leg interface
11 external load mass rope length adjustment device
11a forward leg length adjustment unit
11b aft leg length adjustment unit
12 external load mass
13 lift direction
14 external load mass deflection angle
14a external load mass lift position
14b external load mass flight position
15 length adjustment device functional diagram
15a lengthening rate axis
15b load mass increase axis
16 length adjustment function graph
17 V-rope height
18 cargo hook clearance
19a connection leg hover angle
19b connection leg flight angle
20 V-rope
20a V-rope upper end line
20b V-rope lower end line
20c V-rope pivot points line
20d V-rope center line
21 V-rope delta length
22 guide pulley arrangement
22a guide pulley
22b connecting interface
23a, 23b spring coil dampers
24a carbon spring
24b spring coil damper housing
24c upper housing hook
24d damper piston
24e lower housing hook
25a, 25b pulley block arrangements
26a upper pulleys
26b lower pulleys
26c pulley supporting frame
26d supporting frame hook

What is claimed is:

1. An external load mass rope for attachment to a cargo hook device of a rotorcraft that comprises at least one first cargo hook and at least one second cargo hook, the external load mass rope comprising at least one first rope leg and at least one second rope leg, wherein the at least one first rope leg is configured for attachment to the at least one first cargo hook and the at least one second rope leg is configured for attachment to the at least one second cargo hook, wherein at least one third rope leg is connected to the at least one first rope leg and the at least one second rope leg such that the at least one first, second and third rope legs define a Y-rope, the at least one third rope leg comprising an external load mass interface for attachment to an external load mass that is to be carried by the rotorcraft in operation, wherein the first rope leg comprises a first length adjustment unit in-line with the first rope leg and that is adapted to shorten or lengthen the first rope leg in flight operation of the rotorcraft on the basis of associated operating parameters, and wherein the second rope leg comprises a second length adjustment unit in-line with the second rope leg and that is adapted to shorten or lengthen the second rope leg in flight operation of the rotorcraft on the basis of the associated operating parameters, the first and second length adjustment units defining a length adjustment device;

wherein the external load mass is deflected in forward flight direction or backward flight direction of the rotorcraft in operation by an associated external load mass deflection angle; and wherein the cargo hook device is configured as a double cargo hook arrangement defining a forward cargo hook attachment point and an aft cargo hook attachment point, the first rope leg of the external load mass rope being a forward leg configured for attachment to the forward cargo hook attachment point using the at least one first cargo hook and with the first length adjustment unit being adapted to shorten or lengthen the forward rope leg in flight operation, the second rope leg of the external load mass rope being an aft leg configured for attachment to the aft cargo hook attachment point using the at least one second cargo hook and with the second length adjustment unit being adapted to shorten or lengthen the aft rope leg in flight operation.

2. The external load mass rope according to claim 1, wherein the first and second length adjustment units comprise shortening and lengthening capacities that are defined as a function of a predetermined clearance between the at least one first cargo hook and the at least one second cargo hook.

3. The external load mass rope according to claim 1, wherein the first and second length adjustment units are adapted to shorten or lengthen the first and second rope legs in flight operation on the basis of the associated operating parameters for distributing a payload that is applied to the external load mass rope to the at least one first rope leg and the at least one second rope leg.

4. The external load mass rope according to claim 1, wherein the associated operating parameters comprise at least weight and dimensions of the external load mass and/or the external load mass deflection angle.

5. The external load mass rope according to claim 4, wherein the first and second length adjustment units are adapted to shorten or lengthen the first and second rope legs in flight operation depending at least on the weight and dimensions of the external load mass and/or the external load mass deflection angle for distributing a payload that is applied to the external load mass rope by the external load mass to the at least one first rope leg and the at least one second rope leg.

6. The external load mass rope according to claim 1, wherein the first length adjustment unit and/or the second length adjustment unit is defined by a rope material having predefined lengthening properties for elastic elongation.

7. The external load mass rope according to claim 6, wherein the rope material comprises polyamide.

8. The external load mass rope according to claim 1, wherein the first length adjustment unit and/or the second length adjustment unit comprises at least one spring coil damper having predefined dampening properties.

9. The external load mass rope according to claim 8, wherein the predefined dampening properties are configured to enable the length adjustment device to distribute a payload that is applied in operation to the external load mass rope to the at least one first rope leg and the at least one second rope leg such that the payload may exceed a maximum payload that is applicable to each one of the at least one first and second cargo hooks separately.

10. The external load mass rope according to claim 1, wherein the first length adjustment unit and/or the second length adjustment unit comprises at least one pulley block arrangement, wherein at least a part of the at least one first rope leg and/or the at least one second rope leg is enrolled on the at least one pulley block arrangement.

11. The external load mass rope according to claim 10, wherein at least the part of the at least one first rope leg and/or the at least one second rope leg that is enrolled on the at least one pulley block arrangement comprises a rope material having predefined lengthening properties for elastic elongation, in particular polyamide.

12. The external load mass rope according to claim 10, wherein the at least one pulley block arrangement comprises a plurality of pulleys on which the part of the at least one first rope leg and/or the at least one second rope leg is enrolled.

13. The external load mass rope according to claim 1 wherein a distal end of each of the first, second, and third rope legs are directly coupled to an interface to connect the first, second, and third legs together such that the distal ends of each of the first, second, and third rope legs are fixed relative to one another.

14. A rotorcraft comprising:

a cargo hook device connected to one of a fuselage and a landing gear and having a double cargo hook arrangement with a forward cargo hook attachment point and an aft cargo hook attachment point spaced apart from one another longitudinally;

an external load mass rope having a first rope leg, a second rope leg, and a third rope leg, a first end of each of the first, second and third rope legs coupled to one another such that the external mass rope defines a Y-rope, the first rope leg having a first length adjustment unit, in-line with the first rope leg and the second rope leg having a second length adjustment unit in-line with the second rope leg;

a forward cargo hook attaching a second end of the first rope leg of the external load mass rope to the forward cargo attachment point;

an aft cargo hook attaching a second end of the second rope leg of the external load mass rope to the aft cargo attachment point;

an external load mass interface connected to a second end of the third rope leg, the external load mass interface configured to attach an external load mass to be carried by the rotorcraft in flight operation;

wherein the first length adjustment unit is configured to shorten or lengthen the first rope leg during flight operation of the rotorcraft on the basis of associated operating parameters; and wherein the second length adjustment unit is configured to shorten or lengthen the second rope leg during flight operation of the rotorcraft on the basis of associated operating parameters.

15. The rotorcraft of claim 14 wherein the external load mass is deflected in forward flight direction or backward flight direction of the rotorcraft in operation by an associated external load mass deflection angle;

wherein the first length adjustment unit is configured to lengthen and the second length adjustment unit is configured to shorten in response to forward flight direction of the rotorcraft; and wherein the first length adjustment unit is configured to shorten and the second length adjustment unit is configured to lengthen in response to backward flight direction of the rotorcraft.

16. The rotorcraft of claim 14 wherein the first and second length adjustment units are configured to vary a length of the first and second rope legs, respectively, with a variation in an external load mass deflection angle of the external load relative to the rotorcraft in forward or backward flight and thereby divide and distribute a mass of the external load to the forward and aft cargo hooks.

17. The rotorcraft of claim 14 wherein each of the first and second length adjustment units comprise a spring coil damper.

18. The rotorcraft of claim 17 wherein the spring coil damper of each of the first and second length adjustment units comprises a housing containing a spring coil connected to a piston, the housing defining a first connection hook and the piston defining a second connection hook.

19. A rotorcraft comprising:

a cargo hook device connected to one of a fuselage and a landing gear and having a double cargo hook arrangement with a forward cargo hook attachment point and an aft cargo hook attachment point spaced apart from one another longitudinally;

an external load mass rope having a first rope leg, a second rope leg, and a third rope leg, a first end of each of the first, second and third rope legs coupled to one another such that the external mass rope defines a Y-rope, at least one of the first rope leg and the second rope leg having an associated length adjustment unit in-line with the associated rope leg and configured to shorten or lengthen the associated rope leg during flight operation of the rotorcraft on the basis of associated operating parameters;

a forward cargo hook attaching a second end of the first rope leg of the external load mass rope to the forward cargo attachment point;

an aft cargo hook attaching a second end of the second rope leg of the external load mass rope to the aft cargo attachment point; and an external load mass interface connected to a second end of the third rope leg, the external load mass interface configured to attach an external load mass to be carried by the rotorcraft in flight operation.

20. The rotorcraft according to claim 19 wherein the a length of the length adjustment unit is configured to vary in response to a varying external load mass deflection angle based on a deflection of the external load mass in forward flight direction or backward flight direction of the rotorcraft, and a weight of the external load mass.

* * * * *